United States Patent [19]

Meldahl et al.

[11] 4,328,884
[45] May 11, 1982

[54] CLUTCH EMPLOYING ARTICULATED CLUTCH SHOES AND FLYWEIGHTS

[75] Inventors: Robert D. Meldahl, Granville; Robert J. Borel, Columbus, both of Ohio

[73] Assignee: J. A. Masterson & Co., Columbus, Ohio

[21] Appl. No.: 146,102

[22] Filed: May 2, 1980

Related U.S. Application Data

[63] Continuation-in-part of Ser. No. 808,336, Jun. 20, 1977, Pat. No. 4,226,313.

[51] Int. Cl.³ .............................................. F16D 43/14
[52] U.S. Cl. .............................................. 192/105 CF
[58] Field of Search ................. 192/105 CF, 105 CE, 192/105 CD

[56] References Cited

U.S. PATENT DOCUMENTS

| 682,591 | 9/1901 | Harrison | 192/105 CF |
|---|---|---|---|
| 699,461 | 5/1902 | Dysterud | 192/105 CF |
| 725,617 | 4/1903 | Eisenhart | 192/105 CE |
| 2,333,680 | 11/1943 | Schneider et al. | 192/105 CF |

FOREIGN PATENT DOCUMENTS

| 501984 | 2/1920 | France | 192/105 CF |
|---|---|---|---|
| 2406126 | 6/1979 | France | 192/105 CF |

*Primary Examiner*—George H. Krizmanich
*Attorney, Agent, or Firm*—Fay & Sharpe

[57] ABSTRACT

A clutch employing articulated clutch shoes in pairs and flyweights for loads requiring variable torque such as lawn mowers. This articulated construction employs flyweights with cylindrical noses for placing pressure on clutch shoes of lower order of magnitude.

4 Claims, 4 Drawing Figures

CLUTCH EMPLOYING ARTICULATED CLUTCH SHOES AND FLYWEIGHTS

This application is a continuation-in-part of application Ser. No. 808,336, filed June 20, 1977, now U.S. Pat. No. 4,226,313.

BACKGROUND OF THE INVENTION

Certain small power driven units require a clutch and/or a brake for safety purposes. The driven member may consist of a blade of a lawnmower. A number of clutches have been devised but have many shortcomings.

The invention herein is directed to a quick acting clutch with a driving clutch drum of friction material which is directly connected to an engine and a driven pair of clutch shoes which are pivotally connected to flyweights. The advance in this design relates to the greater leverage for the centrifugal forces acting on the flyweights resulting in higher forces with smaller flyweights. Thus, the pivoted shoes permit greater leverage which distribute the forces over a larger area of the clutch shoes and drums and does so by wearing evenly. Accordingly, unit stresses on the friction material of the cylindrical drum are lower with consequent lower wear.

Prior to this invention, flyweight clutches had highly stressed nose portions which rapidly wore the cylindrical drum and occasionally caused crumbling failures.

SUMMARY OF THE INVENTION

In the flyweight clutch field there is a need for an improved contact between a clutch drum of cylindrical friction material and the flyweights. The present invention is in the development of a two-piece flyweight which is interconnected to a clutch shoe in a cylindrical socket to provide improved motion therebetween. The construction has the following advantages: First, the pivoted shoe could align itself with the friction drum and spread the contact forces over the entire length of the shoe. This eliminates the concentration of high stresses at the end of the fixed shoe and permits a higher total force to be transmitted while producing lower stresses at any given point. Second, the higher force may be developed with a smaller flyweight because the pivoted shoe permits a design that provides greater leverage for the centrifugal force acting on the flyweight. Third, because the stresses in the friction material are reduced, there is less wear on the friction drum. With the integral design substantial clearance is allowed between the flyweight and the clutch housing to allow the flyweight to swing out as the shoe moves inwardly to accommodate wear of the friction drum. Some of this clearance can now be used to increase the size of the flyweight enough for the clutch to transmit the power of a more powerful engine, even at lower speeds.

DESCRIPTION OF THE PREFERRED EMBODIMENT

Figure 1:
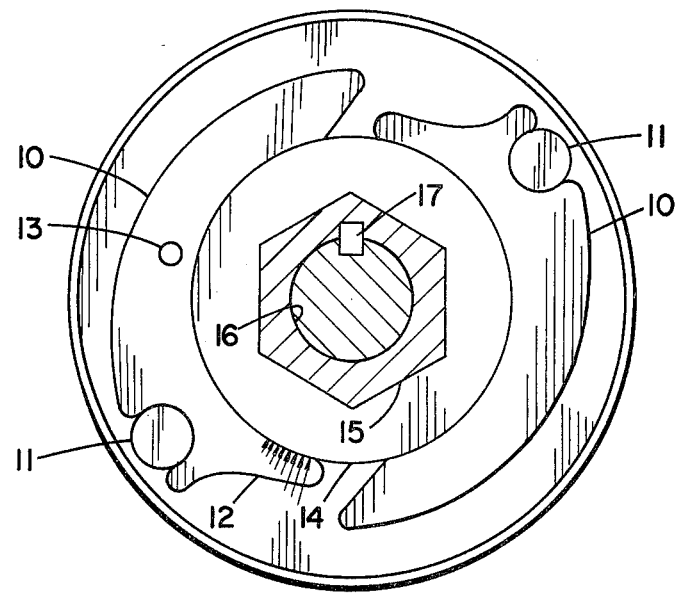
FIG. 1 is a plan view of a prior art flyweight clutch.

In this flyweight clutch, the prior art is illustrated in FIG. 1, where 10 is a one-piece flyweight and 11 is the pivot pin. The nose portion is shown stressed as at 12. The center of gravity of the flyweight is noted at 13. The one-piece design shown in FIG. 1 illustrates the stresses between the shoe and the friction drum 14. Notice also its hub 15, drive shaft 16 and keyway 17. The stresses in this view are concentrated at the toe of the clutch shoe. For a given clutch capacity, the stresses are much higher than for those with articulated shoes where the stresses are spread uniformly over a much larger area. The leverage exerted by centrifugal forces acting on the flyweights are also improved. The distance between the center of gravity 13 and the pivot can be compared with the distance to the nose portion 12. Compare these two moment arms with the comparable distances in FIG. 2, illustrating the present invention.

Figure 2:
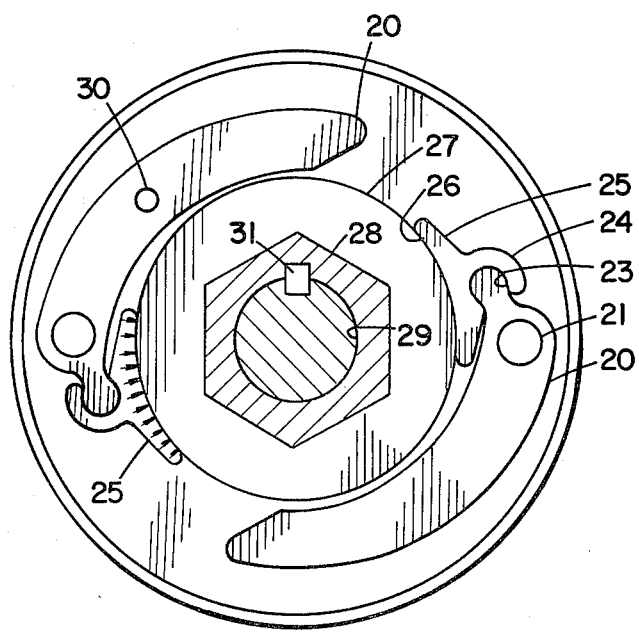
FIG. 2 is a plan view of the improved articulated clutch employing flyweights and clutch shoes.
Figure 3:
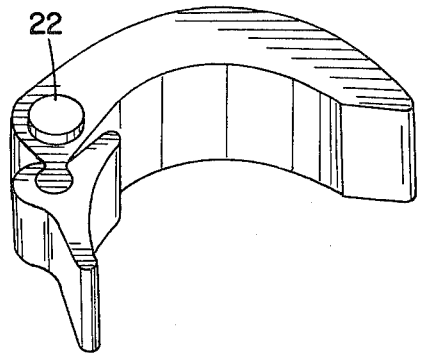
FIG. 3 is a schematic view of the flyweight and interconnected clutch shoe.

In FIG. 2, 20 shows the articulated flyweights and 21 is the pivot point which is secured in a casing by ears 22. The nose of the flyweight 23 is partially enclosed by curved portion 24 of the clutch shoe 25, which has a clutch facing 26 in contact with the clutch drum 27. The drum surrounds a hexagonal hub 28 and shaft 29, and is attached by means of keyway 31. The center of gravity of the articulated flyweight is marked at 30. A visual comparison will emphasize that the relative length of the moment arms of the two FIGS.—1 and 2—will point out the stresses on clutch shoe 25 are much higher assuming equivalent speeds and flyweights. However, the unit stresses are lower over the larger area of the clutch shoes. Lower stresses on the clutch drum with lower wear rates and life expectancy result.

Figure 4:
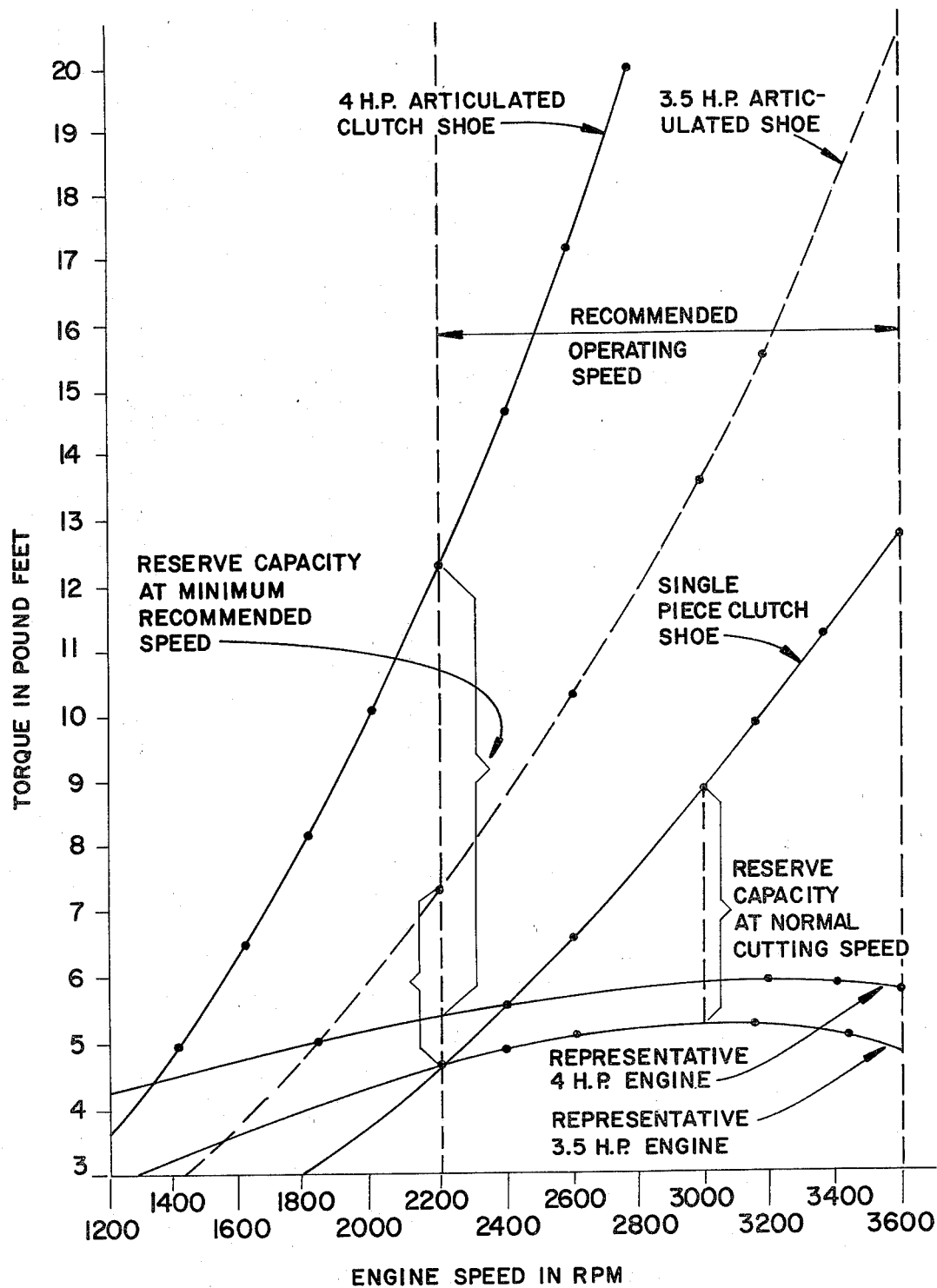
FIG. 4 is a torque speed diagram showing the manner in which this clutch produces greater reserve torque capacity at recommended speed and at least some reserve torque capacity below recommended speed.

FIG. 4 is a diagram of the torque-speed curves of mass-produced 3½-and 4-horsepower engines. Superimposed on the torque-speed curves are the clutch torque-speed curves which show that it becomes possible to reduce the engagement and release speeds of the clutch from 2200 rpm to 1500 rpm and by the use of the articulated clutch flyweights of this invention to apply the clutch to a 4-horsepower engine as well as the popular 3½-horsepower model. In this diagram there is illustrated the reserve capacity in the clutch to continue engagement to lower speeds before release. This means that the variable loads required can be accommodated without stalling out too often. Note the much higher reserve capacity at minimum recommended speed. The unmarked bracket is the reserve capacity at minimum recommended speed for the articulated shoe with a 3½-horsepower engine.

The invention has been described in detail sufficient to enable one of ordinary skill in the art to make and use the same. Obviously, modifications and alterations of the preferred embodiment will occur to others upon a reading and understanding of the specification and it is our intention to include all such modifications and alterations as part of our invention insofar as they come within the scope of the appended claims.

What is claimed is:

1. A flyweight clutch characterized by a casing drum, shoes and flyweights having a greater reserve torque capacity at low engine speeds with lower stress on the drum comprising:
    (a) a cylindrical drum of friction material;
    (b) at least a pair of clutch shoe segments in close proximity to said drum;

(c) at least a pair of flyweights, closely surrounding the drum and pivoted to the casing, each of which has a weight on one end and a toe in contact with said shoe, whereby the clutch transfers a balance of forces to the drum through the flyweights to the toe and shoes allowing the engine adequate reserve torque at low engine speeds without stalling.

2. The clutch of claim 1 in which the clutch shoe and flyweights are interconnected with a cylindrical socket.

3. The clutch of claim 1 in which the clutch shoes are diametrically across from one another on opposite sides of the drum.

4. The clutch of claim 1 in which the flyweights are pivoted and interconnected to the driving member to provide a secure connection for force transmitted.

* * * * *